March 25, 1924.                     1,488,139
F. WERNER
UTENSIL CLEANING APPARATUS
Filed June 7, 1920

INVENTOR.
Frank Werner

Patented Mar. 25, 1924.

1,488,139

UNITED STATES PATENT OFFICE.

FRANK WERNER, OF OKLAHOMA CITY, OKLAHOMA.

UTENSIL-CLEANING APPARATUS.

Application filed June 7, 1920. Serial No. 387,209.

*To all whom it may concern:*

Be it known that I, FRANK WERNER, a citizen of the United States, and a resident of Oklahoma city, county of Oklahoma, and State of Oklahoma, have invented new and useful Improvements in Utensil-Cleaning Apparatus, of which the following is a specification.

This invention relates to a dairy or creamery appliance or utensil.

The invention comprehends the provision of means for so caring for milk-cans and other like utensils that they can not only be cleansed, but rapidly so, and safely so.

It is an object of the invention to provide for complete sterilization of the utensils throughout the cleansing operation, giving the operator complete control over the utensil from the beginning to the ending of the cleansing operation, thus avoiding delay, out of which comes the safety of the matter especially when it is understood that even short delays from the beginning of cleaning to the completion of same may produce or provide for deposits, especially while the utensil is wet, of matter that will be deleterious to the contents the utensil will afterward contain.

To this end the invention provides an appliance having means whereby the utensil may be washed, rinsed and sterilized or steamed and dried all while the same is under the immediate control of the operator thus preventing the development of galactotoxin.

The principles of the invention, looking to the accomplishment of the matters stated, may, of course, be had in any suitable efficient manner, and through the proper arrangement of suitable devices for that purpose, one of such devices being shown on the sheet of drawings, accompanying and forming a part of the invention, and in which Figure 1 is an elevational view of a device incorporating some of the essentials of the appliance;

In these several views, similar characters of reference indicate similar parts throughout.

Figure 1:
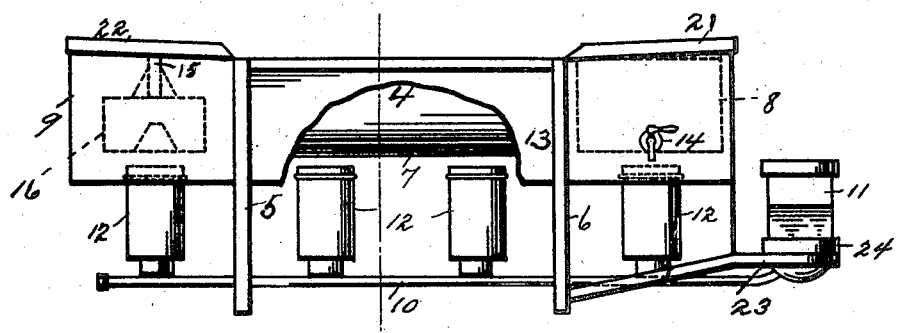
Figures 2, 3:
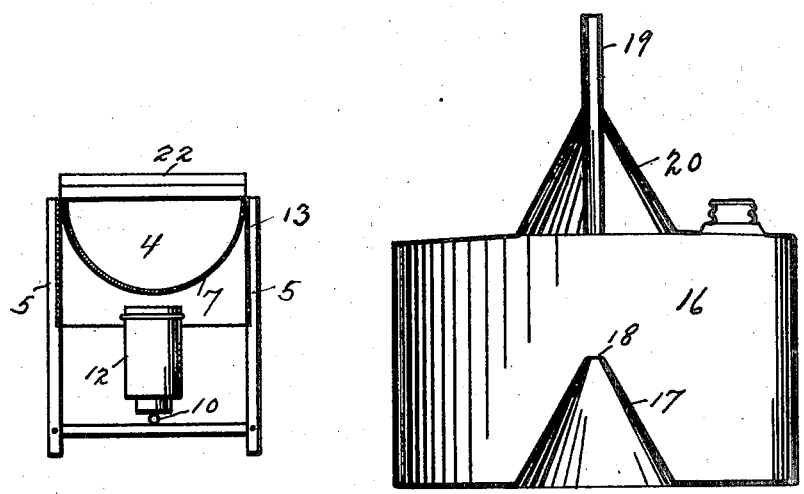
Figure 2 is an end view in section, partly.
Figure 3 is a sectional view of a device for steaming the utensil.

Coming together in suitable association and by suitable framings are a washing trough 4 which is supported by standards 5 and 6 which constitute the supporting stand of the device, being especially formed with a curved bottom 7 to give a rolling movement during washing of the utensil, such as milk cans; a rinsing tank or chamber 8 carried by said standards 6, and a sterilizing instrumentality composed of the steamer 16 soon to be described and the enclosing member 9, supported by the standards 5. Beneath these associated devices a pipeline 10 supported by the standards projects from a reservoir 11 and feeds a multiplicity of burners 12 that furnish heat to the devices or compartments named, and for preventing the heat from those that supply the tank 4 from interfering with the operator, an apron 13 is suitably formed in connection with that receptacle. To draw off the water from the rinsing tank 8 a spigot 14 may be provided.

Within the member 9, and supported therein by brackets 15 is a steamer 16 having a cone 17 in the interior of the steamer, and its opening 18 is in alignment with a tube 19 extending above the outside of the steamer so as to conduct both the steam and the drying air to the interior of the can whose mouth, while the can is inverted is deposited over the cone 20, extending above the steamer 16; this steamer is designed to contain water. By this arrangement the washed and rinsed can may be both steamed and subjected to heated air as a finishing operation before the utensil is finally disposed of.

Each tank 8 and 9 is provided with a dripping pan 21 and 22 for use in cleansing smaller articles as well as cans preparatory to the final operation.

The reservoir 11 may be suitably supported from brackets 23 and a retainer 24 all of which lead from the standards 6.

The operation of course will be obvious. The can is washed by depositing on its side in the tank 4, given a rolling motion and thoroughly cleansed while the water is heated from the burners beneath the tank; the same is then rinsed in the rinsing tank 8. Here it is desired for a time that the same may be deposited invertedly upon the drip-pan 21 or 22 and then while inverted slipped over the pipe 19 and cone 20, after drip pan 22 has been lifted while the heat and steam sterilize and dry the interior of the can. It is obvious that the association of the various parts in such manner as to make the complete operation effective without interruption is an advantage to be desired especially for cleansing containers that should be thoroughly dried before being set aside or stored for use.

Having thus described this invention, I claim—

1. A device of the character stated, comprising a washing trough and a support therefor, burners disposed beneath the same, a steamer supported at one end of said support, with a burner beneath the same, said steamer having a cone opening upward within the steamer, and a cone at the upper end of the steamer and having a tube and an opening in alinement with the opening in the lower cone to receive an inverted can.

2. A device of the character stated, comprising a washing trough and a support therefor, burners disposed beneath the same, a steamer supported at one end of said support, with a burner beneath the same, said steamer having a cone opening upward within the steamer, a cone at the upper end of the steamer and having a tube and an opening in alinement with the opening in the lower cone to receive an inverted can, and an apron depending upon both sides of the washing trough adjacent said steamer.

In witness whereof I sign my name this 26th day of May, in the year of our Lord, nineteen hundred and twenty.

FRANK WERNER.